United States Patent
Yanagawa (10) Patent No.: US 8,699,051 B2
(45) Date of Patent: Apr. 15, 2014

(54) PREVENT PRINTING IF IMAGE DATA ON PREPRINTED SHEET DOES NOT MATCH DATA ON AT LEAST ONE SHEET

(75) Inventor: Katsuhiko Yanagawa, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 346 days.

(21) Appl. No.: 12/850,464

(22) Filed: Aug. 4, 2010

(65) Prior Publication Data

US 2011/0032559 A1 Feb. 10, 2011

(30) Foreign Application Priority Data

Aug. 7, 2009 (JP) ................. 2009-184102

(51) Int. Cl.
*G06K 15/00* (2006.01)
(52) U.S. Cl.
USPC ........................................................ 358/1.14
(58) Field of Classification Search
USPC ........................................................ 358/1.14
See application file for complete search history.

(56) References Cited

U.S. PATENT DOCUMENTS

| | | | |
|---|---|---|---|
| 4,732,261 A * | 3/1988 | Mattern et al. ................. | 198/431 |
| 6,206,358 B1 * | 3/2001 | Yamaguchi et al. ....... | 270/52.02 |
| 6,260,837 B1 * | 7/2001 | Nanba et al. ............... | 270/58.08 |
| 7,315,403 B2 * | 1/2008 | Konishi ........................ | 358/403 |
| 7,454,163 B2 * | 11/2008 | Kasahara et al. ............. | 399/408 |
| 2001/0018626 A1 * | 8/2001 | Moriyama et al. ............ | 700/223 |
| 2004/0128532 A1 * | 7/2004 | Ohishi et al. .................. | 713/200 |
| 2008/0180753 A1 * | 7/2008 | Maeno ......................... | 358/3.28 |
| 2008/0278770 A1 * | 11/2008 | Sakuramata et al. ......... | 358/448 |
| 2009/0216680 A1 * | 8/2009 | McCown et al. ............... | 705/75 |
| 2009/0225334 A1 * | 9/2009 | Takamiya et al. ............. | 358/1.9 |

FOREIGN PATENT DOCUMENTS

| | | |
|---|---|---|
| JP | 11-105455 A | 4/1999 |
| JP | 2004-155152 A | 6/2004 |
| JP | 2009-065480 A | 3/2009 |

* cited by examiner

*Primary Examiner* — Eric A Rust
(74) *Attorney, Agent, or Firm* — Canon USA, Inc. IP Division (57) ABSTRACT

A method is provided that restricts execution of a job where a finished sheet which is specified in a job, and another finished sheet that is fed, do not match each other. The method for controlling a data processing apparatus for causing a post-processing apparatus to execute post-processing on a print product output by executing printing based on print data received from an information processing apparatus includes inputting image data generated by reading a sheet to be post-processed, receiving checking data for checking an image of the sheet, and restricting, if the checking data does not match the input image data, execution of the post-processing.

12 Claims, 11 Drawing Sheets

PREVENT PRINTING IF IMAGE DATA ON PREPRINTED SHEET DOES NOT MATCH DATA ON AT LEAST ONE SHEET

BACKGROUND OF THE INVENTION

1. Field of the Invention

The present invention relates to a data processing apparatus, a method for controlling the data processing apparatus, and an information processing apparatus.

2. Description of the Related Art

A conventional printing system includes an editing and bookbinding function for generating a desired document by dynamically integrating an insertion sheet that has been previously set on an apparatus included in the system, with a sheet to be output onto which an image is to be formed.

However, because a user sets an insertion sheet by hand, the user may make an operation error, such that the user sets a wrong sheet on the apparatus. Furthermore, the user may set an insertion sheet on a wrong side or from a wrong edge. If print processing is started in this state, resulting printed products including inappropriately set insertion sheet are bound into a book. As a result, sheets may be wastefully consumed.

In order to address this, Japanese Patent Application Laid-Open No. 11-105455 discusses a book binding apparatus, which is configured, in binding a printed top cover and printed sheet bundle into one book, to read identification information (e.g., bar codes) printed on the top cover and a part of the printed sheet bundle and configured to start book binding processing if it is determined that identification information printed on the top cover matches the identification information printed in a part of the printed sheet bundle.

However, in the above-described conventional method, it is always necessary to print the identification information, such as bar codes, on the top cover and in apart of the printed sheet bundle.

Accordingly, if no margin for printing identification information therein is provided, the identification information cannot be printed. In addition, in the above-described conventional method, the presence of the printed identification information may degrade the design of the top cover.

SUMMARY OF THE INVENTION

According to an aspect of the present invention, a data processing apparatus for causing a post-processing apparatus to execute post-processing on a print product output by executing printing based on print data received from an information processing apparatus includes an input unit configured to input image data generated by reading a sheet to be post-processed, a receiving unit configured to receive checking data for checking an image of the sheet, and a control unit configured, if the checking data does not match the image data input, to restrict execution of the post-processing.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 5 (including FIG. 5A and FIG. 5B) is a flow chart illustrating an example of data processing executed by an information processing apparatus.

DESCRIPTION OF THE EMBODIMENTS

Various exemplary embodiments, features, and aspects of the invention will be described in detail below with reference to the drawings.

Figure 1:
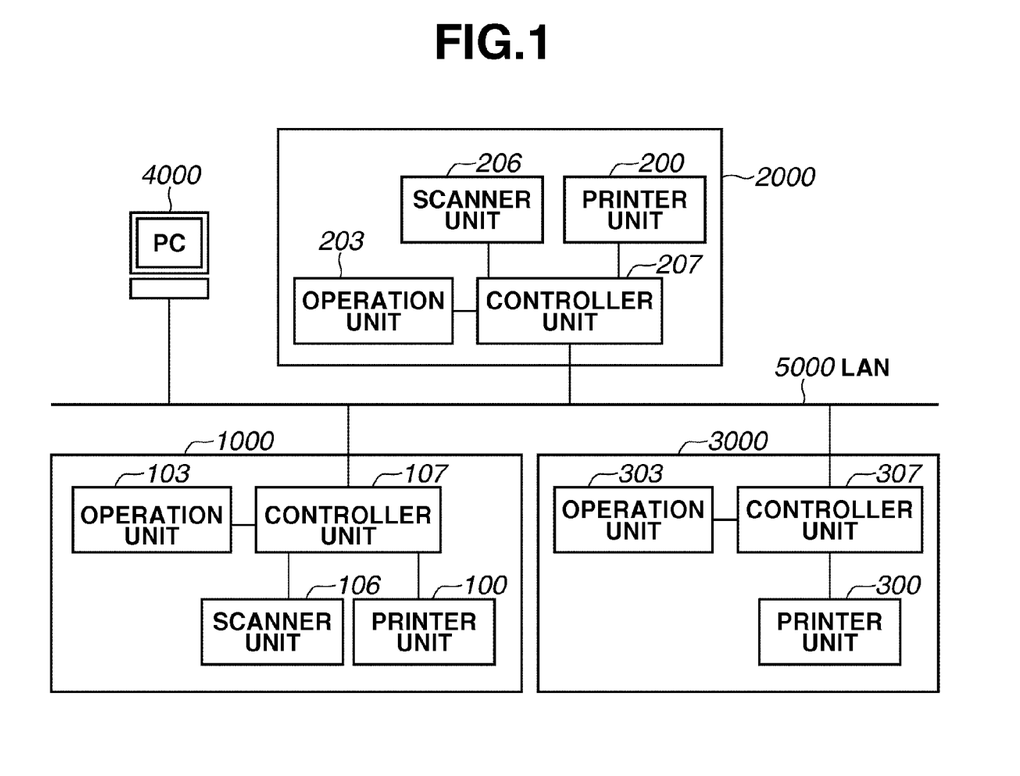
FIG. 1 is a block diagram illustrating an exemplary configuration of a printing system.

FIG. 1 is a block diagram illustrating an exemplary configuration of a data processing system including a data processing apparatus according to a first exemplary embodiment of the present invention. Referring to FIG. 1, each of image forming apparatuses 1000, 2000, and 3000 are an example of the data processing apparatus according to the present exemplary embodiment.

In the example illustrated in FIG. 1, an information processing apparatus 4000 and three image forming apparatuses (the image forming apparatuses 1000, 2000, and 3000) are connected to a local area network (LAN) 5000. However, the present invention is not limited to this.

In addition, the present exemplary embodiment uses a LAN as a method for connecting to the information processing apparatus. However, the present exemplary embodiment is not limited to this. More specifically, it is also useful if an arbitrary network, such as a wide area network (WAN) (public line), a serial transmission method, such as universal serial bus (USB), or a parallel transmission method, such as Centronics or small computer systems interface (SCSI) is used as the method for connecting to the information processing apparatus.

The information processing apparatus (hereinafter simply referred to as a "personal computer (PC)") 4000 has a function of a general purpose personal computer. The PC 4000 is capable of transmitting and receiving a file via the LAN 5000 or a WAN by using a file transfer protocol (FTP) or a server message block (SMB) protocol. In addition, the present exemplary embodiment allows a user to give an instruction for executing print processing from the PC 4000 to the image forming apparatus 1000, 2000, or 3000 by using a printer driver.

In the example illustrated in FIG. 1, the image forming apparatus 3000 is an apparatus having a printing function only. More specifically, the image forming apparatuses 1000 and 2000 each has a scanner unit, with which the image forming apparatus 3000 is not provided.

In the following description, an exemplary configuration of the image forming apparatus 1000 will be primarily described in detail, which represents the image forming apparatuses 1000 and 2000, for easier understanding.

The image forming apparatus 1000 includes a scanner unit 106, a printer unit 100, a controller unit 107, and an operation unit 103. The controller unit 107 controls an operation of the entire image forming apparatus 1000. The operation unit 103 is a user interface. In the example illustrated in FIG. 1, "U" is an abbreviation for "unit".

Similarly, the image forming apparatus 2000 includes a scanner unit 206, a printer unit 200, a controller unit 207, and an operation unit 203. On the other hand, the image forming apparatus 3000 includes a printer unit 300, a controller unit 307, and an operation unit 303 but does not include a scanner unit.

In the following description, an exemplary configuration of the printer unit 100 (FIG. 1), the scanner unit 106 (FIG. 1), and the operation unit 103 will be described in detail with reference to FIG. 2.

Figure 2:
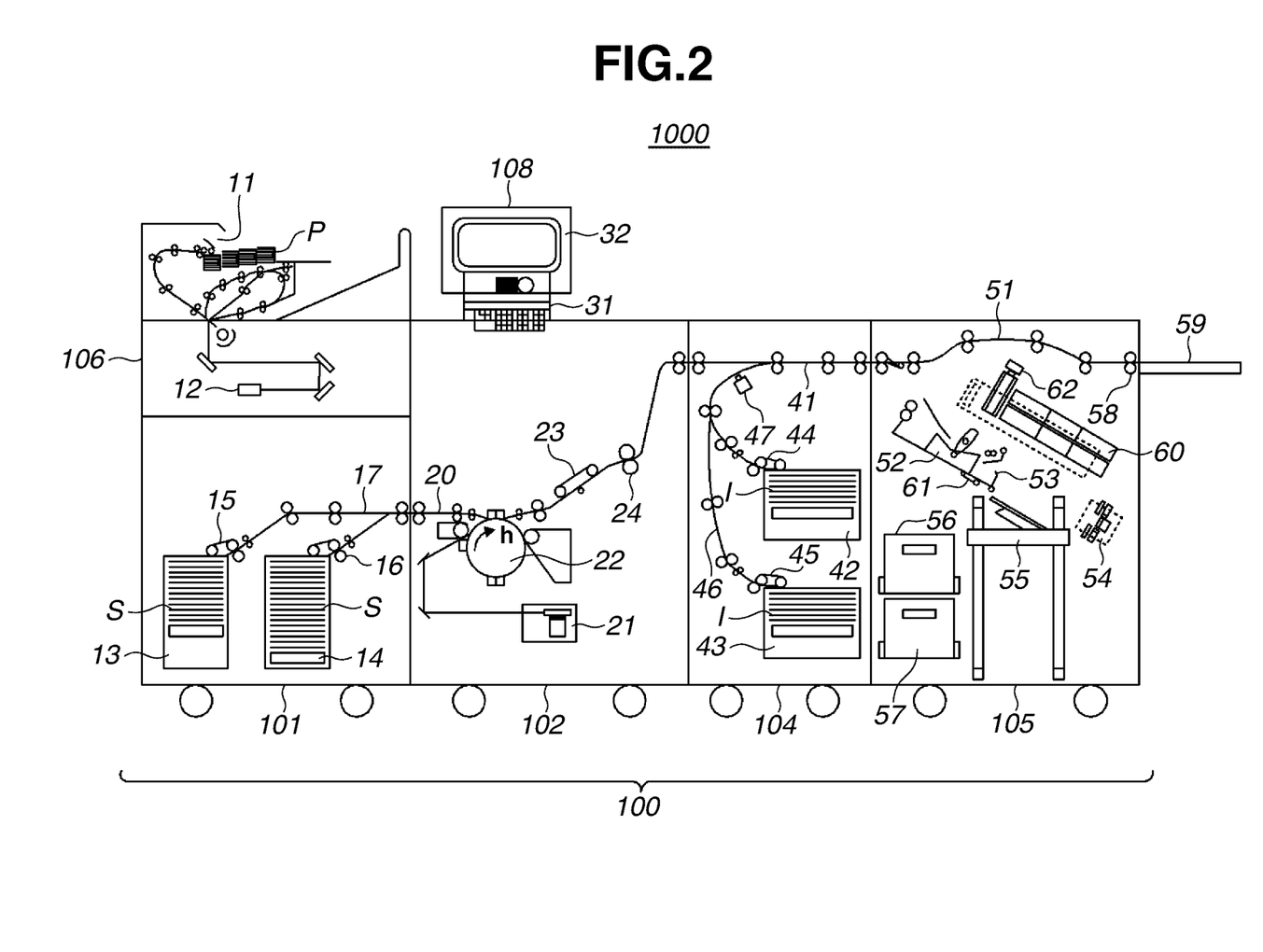
FIG. 2 is across section of an image forming apparatus, which illustrates exemplary components of the image forming apparatus.

FIG. 2 is a cross section of the image forming apparatus 1000, which illustrates exemplary components of the image forming apparatus 1000. Referring to FIG. 2, the printer unit 100 includes a paper feed unit 101, an image forming unit 102, an inserter 104, and a book binding unit 105.

In the present exemplary embodiment, the book binding unit 105 includes a case binding function for case-binding an output sheet bundle (output products), which has been output as a result of executing a job, with a top cover sheet fed from the inserter 104. The inserter 104 can also be used to implement a sheet insertion function for inserting a sheet between a print product of one job and a print product of another job.

The scanner unit 106 includes an auto document feeder (ADF) unit 11 and an optical system 12 that reads and scans a document. The ADF 11 feeds a document P, which has been set thereon, to a document reading position. After the document P is read and scanned, the ADF 11 conveys the document P to a paper discharge position.

The paper feed unit 101 includes a plurality of recording paper storage portions 13 and 14, which stack recording sheets S of different sizes. Furthermore, the paper feed unit 101 includes recording sheet feeding units 15 and 16, which feed a recording sheet S.

The paper feed unit 101 conveys the sheet S, which has been fed from the recording sheet feeding units 15 and 16, into the paper conveyance path 20 of the image forming unit 102 via a paper conveyance path 17.

The image forming unit 102 includes a laser scanner 21, an image forming unit 22, a conveyance belt 23, and a conveyance roller 24. The laser scanner 21 scans with a laser beam based on image data read by the optical system 12 and image data generated based on print data received from the PC 4000.

The image forming unit 22 forms a toner image based on the image data scanned with the laser beam emitted by the laser scanner 21. Thus, an image is formed on the sheet S. The sheet S, which now has the image formed by the image forming unit 22 thereon, is conveyed by the conveyance belt 23 and the conveyance roller 24 into a paper conveyance path 41 of the inserter 104.

The inserter 104 includes paper storage portions 42 and 43, paper feed units 44 and 45, and an insertion sheet image reading unit (hereinafter simply referred to as a "reading unit") 47. The paper storage portions 42 and 43 store an insertion sheet I. The paper feed units 44 and 45 feed an insertion sheet I. The reading unit 47 reads an image on an insertion sheet I, which functions as a top cover sheet, and outputs data of the read image to the controller unit 107.

In the present exemplary embodiment, image data of the image read by the reading unit 47 is collated with image data generated based on data for checking a document of the top cover (hereinafter simply referred to as "checking data"), which is transmitted from a printer driver of the information processing apparatus 4000.

More specifically, the image data of the image read by the reading unit 47 is used during processing for determining whether the top cover sheet fed from the inserter 104 is an insertion sheet specified by a user. It is also useful if an area of the top cover sheet to be read for the collation is previously set as a specified area.

In other words, it is also useful if checking data generated by the printer driver is previously associated with a specific area of the image on the top cover sheet. With this configuration, the present exemplary embodiment can determine whether the top cover is appropriate by merely reading a part of the image on the top cover. The insertion sheet I fed in the above-described manner is then conveyed into a paper conveyance path 51 of the book binding unit 105 via paper conveyance paths 46 and 41.

The book binding unit 105 includes a sheet alignment unit 52 and a first sheet contact member 53. The sheet alignment unit 52 stores sheets S or insertion sheets I, which are conveyed via the paper conveyance path 51 in a branched manner and aligns the sheets S or the insertion sheets I conveyed thereto. The first sheet contact member 53 is a member which a leading edge of the sheet contacts.

In addition, the book binding unit 105 includes a tape storage portion 60 and a sheet bundle conveyance unit 61. The tape storage portion 60 stores a binding tape, which is stored in a reel-like shape. The sheet bundle conveyance unit 61 conveys the aligned sheet bundle.

Furthermore, the book binding unit 105 includes a tape cutting portion 62 and a cut tape storage unit 63. The tape cutting portion 62 feeds the binding tape from the tape storage portion 60 and cuts the fed binding tape according to the size of the sheet. The cut tape storage unit 63 stores the binding tape cut by the tape cutting portion 62 and conveys the binding tape to a tape heating unit 54.

Moreover, the book binding unit 105 includes the tape heating unit 54, a carriage 55, and stackers 56 and 57. The tape heating unit 54 applies heat to the aligned sheet bundle and the binding tape. The carriage 55 can be freely elevated to convey a product that has been bound into a book. The stackers 56 and 57 stack book-bound products. A paper discharge roller pair 58 discharges the sheet S, which has been conveyed thereto via the paper conveyance path 51, onto a paper discharge tray 59, which is externally provided.

The operation unit 103 includes a display 32 and an operation keyboard (or a touch panel display) 31. The user can input various setting items, such as the number of prints, the number of copies, editing of an image, processing of an image, and editing of a page of image data of a document via the operation unit 103. In addition, the operation unit 103 displays an operation mode selected by the user and information about a status of the apparatus.

In the present exemplary embodiment, as will be described below, if a print job received from the information processing apparatus includes information for checking the top cover, image data of the image read by the reading unit 47 can be viewed as a preview image. When this configuration is employed, it is also useful if the user is allowed to previously select whether to preview a part of or the entire image data of the read image.

Figure 3:
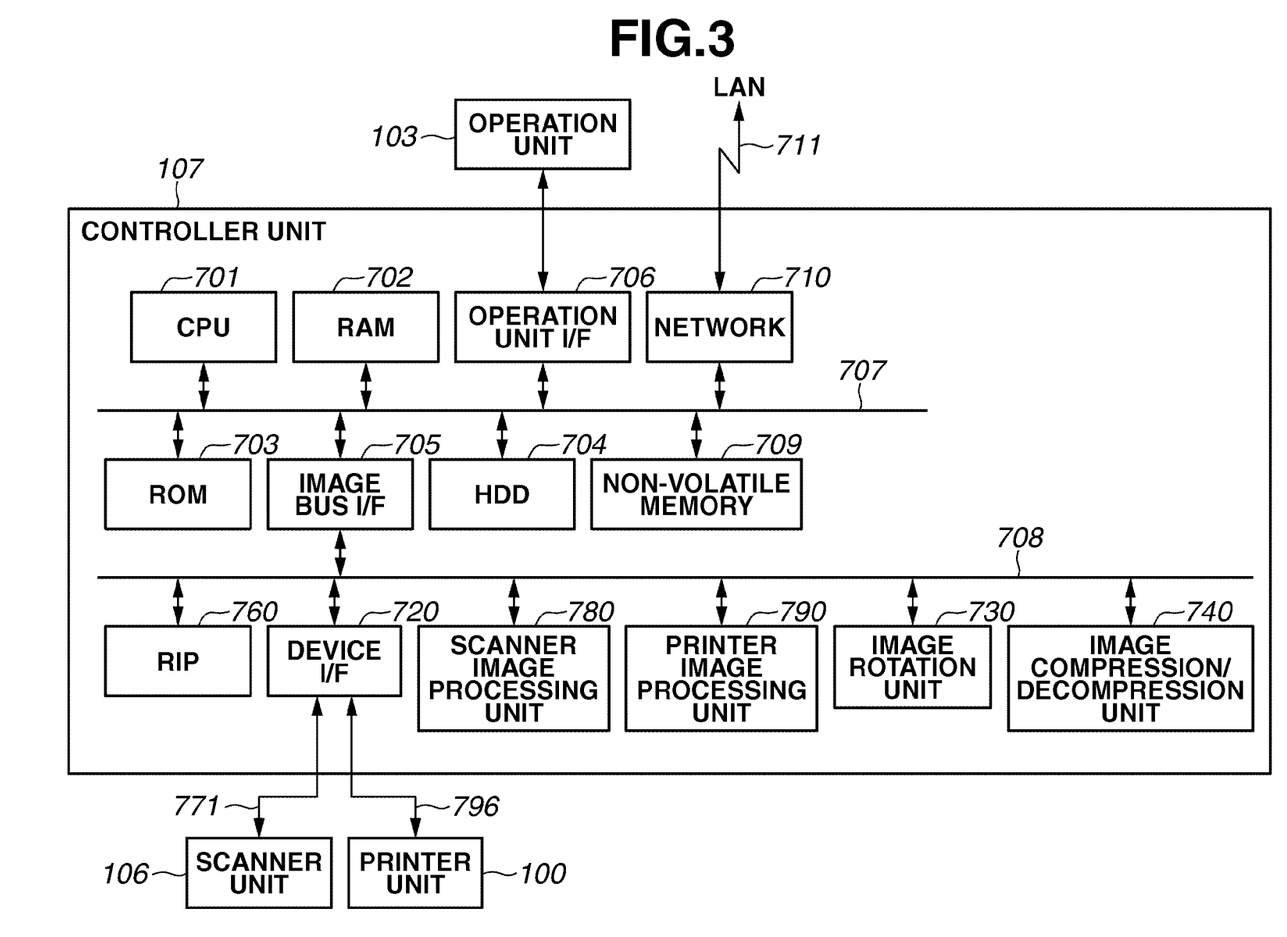
FIG. 3 illustrates an exemplary configuration of a controller unit.

Now, an exemplary configuration of the controller unit 107 will be described in detail below with reference to a block diagram illustrated in FIG. 3. Referring to FIG. 3, the controller unit 107 is connected to the scanner unit (image input device) 106 and the printer unit (image output device) 100.

The controller unit 107, which is also connected to the LAN 5000, includes a central processing unit (CPU) 701. The CPU 701 is a controller for inputting and outputting image data and device information. The CPU 701 loads a control program from a read-only memory (ROM) 703 or a hard disk drive (HDD) 704 onto a random access memory (RAM) 702, which functions as a system work memory, and executes the program to perform various control.

The RAM 702 is also used as an image memory that temporarily stores generated image data. The ROM 703 is a boot ROM and stores a boot program for the CPU 701. The HDD 704 stores system software and image data. A nonvolatile memory 709 is a memory unit that stores a parameter used during booting and other information necessary for the system.

The operation unit I/F 706 is an interface with the operation unit (UI) 103. The operation unit I/F 706 outputs image data to be displayed on the operation unit 103 to the operation unit 103. In addition, the operation unit I/F 706 transmits information input by the user of the image forming apparatus via the operation unit 103 to the CPU 701.

A network 710 is connected to the LAN 5000. Components provided on the network 710 can input and output information via the LAN 5000. The above-described devices are provided on a system bus 707.

An image bus I/F 705 is connected to an image bus 708, which is an image bus for transferring image data at a high speed. Furthermore, the image bus I/F 705 is a bus bridge for converting a structure of data. On the image bus 708, the following devices are provided.

A raster image processor (RIP) 760 rasterizes PDL code into bitmap image data. A device I/F unit 720 is an interface between image input and output devices, such as the scanner unit 106 and the printer unit 100, and the controller unit 107. The device I/F unit 720 executes synchronous/asynchronous conversion of image data. A scanner image processing unit 780 executes correction processing, image processing, and editing processing on input image data.

A printer image processing unit 790 executes correction processing and resolution conversion processing on image data to be printed and output. An image rotation unit 730 executes rotation of image data. An image compression/decompression unit 740 compresses multivalued image data into Joint Photographic Experts Group (JPEG) image data. Furthermore, the image compression/decompression unit 740 compresses binary image data into Joint Bi-level Image Experts Group (JBIG) image data, or the like. In addition, the image compression/decompression unit 740 decompresses the image data compressed in the above-described format.

In the present exemplary embodiment, a printer driver is used as a unit or software for causing a printing device, such as the image forming apparatus 1000, to execute proof output based on data of an application operating on the PC 4000 or to output a completely processed output (print) product. Furthermore, in the present exemplary embodiment, the printer driver is installed on the HDD 704.

Figure 4A:
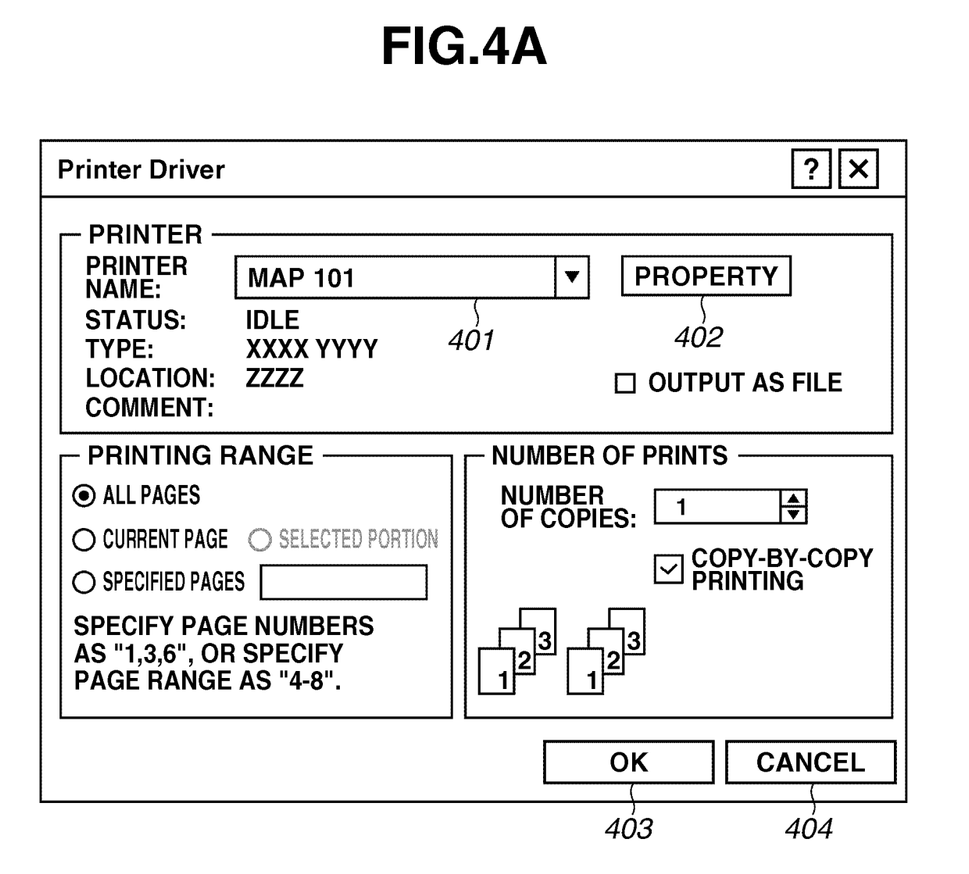
FIGS. 4A and 4B illustrate an example of a user interface (UI) provided by a printer driver.
Figure 4B:
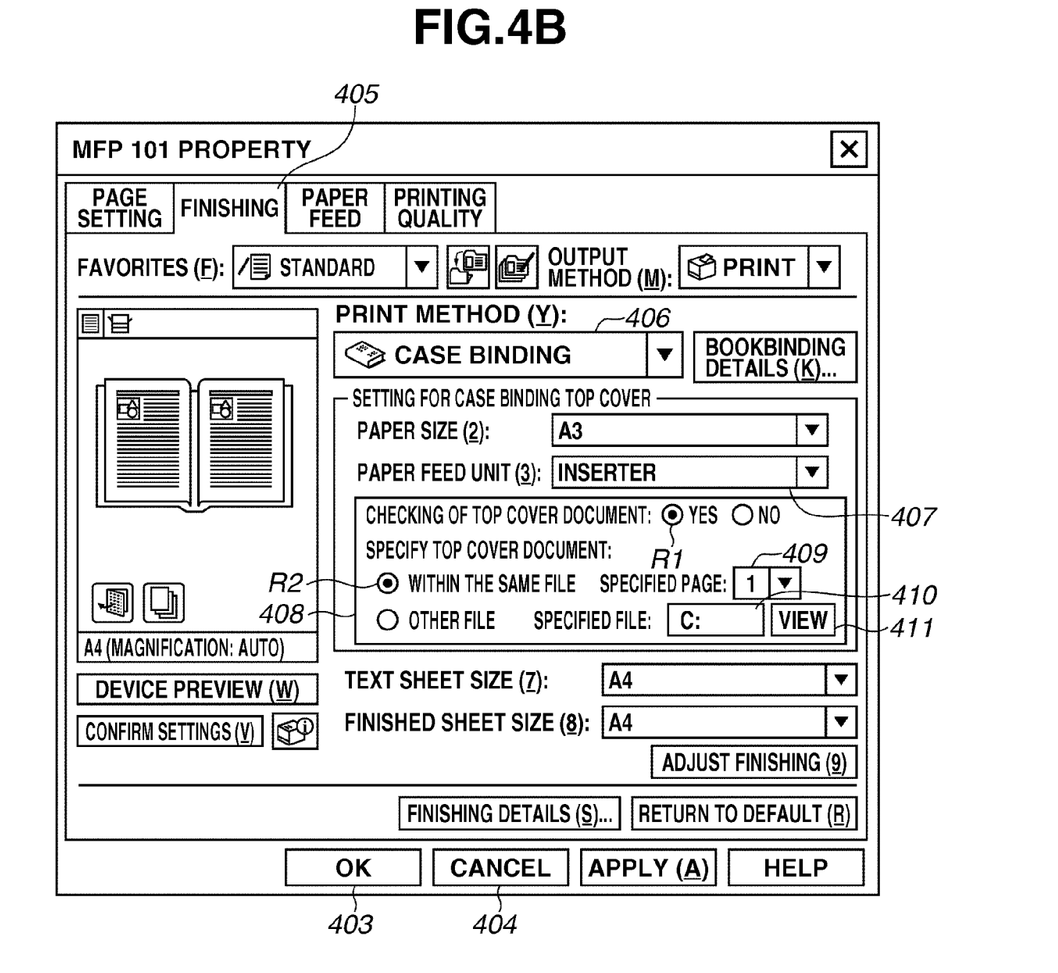

FIGS. 4A and 4B illustrate an example of a user interface provided by the printer driver installed on the PC 4000 (FIG. 1). The example illustrated in FIGS. 4A and 4B corresponds to a setting screen displayed by the image forming apparatuses 1000, 2000, and 3000.

In the present exemplary embodiment, it is supposed that a printer name "multifunction peripheral (MFP) 101" has been set to the image forming apparatus 1000. Furthermore, the user interface illustrated in FIGS. 4A and 4B is generally displayed if an operator (the user) desires to execute printing on a printing device, such as the image forming apparatus 1000, and if the operator selects "print" from a menu of the application.

In this case, the user interface illustrated in FIG. 4A is first displayed. If the user presses a button 402 and further presses a tab 405 in this state, then the user interface illustrated in FIG. 4B is displayed.

The operator selects a printing device to be used from a "printer name" pull-down list box 401 via a setting screen illustrated in FIG. 4A. More specifically, if each printer driver corresponding to the image forming apparatuses 1000, 2000, and the image forming apparatus 3000 has been installed on the PC 4000, the operator can select the printer name of the printer corresponding to each printer driver.

In a "status" field, which is provided below the printer name field, information about the status of the printing device is displayed. Similarly, a type of the printer driver is displayed in a "type" field and information about installation location of the printing device is displayed in a "location" field. In addition, information about a comment from an administrator of the printing device is displayed in a "comment" field.

In outputting the print data as a file without transmitting the print data to the printing device, the user selects an "output as file" check box. In a "printing range" field, the user can specify a range of pages to be printed by selecting either one of alternatives "all pages", "current page", "selected pages", and "specified pages" by using a radio button. If the user has selected the "specified pages", the user (operator) inputs a page number of each page to be printed in an edit box, which is provided in the right portion of the "specified pages" setting field.

In a "number of prints" field, the operator inputs the number of prints in a "number of copies" spin box. In addition, in printing a plurality of pages in the unit of a copy instead of in the unit of a page, the operator selects a "print copy by copy" check box.

By pressing a button 402, which is a button for selecting an item "property", the operator can set detailed printing attributes on the UI illustrated in FIG. 4B. After completely executing the setting via the screen illustrated in FIG. 4B, the user can press an "OK" button 403 to transmit the print data and checking data to the printing devices, such as the image forming apparatus 1000, or to output the data as a file. On the other hand, in suspending the print processing or processing for outputting the data as a file, the operator can press a "cancel" button 404.

Figures 5, 5A:
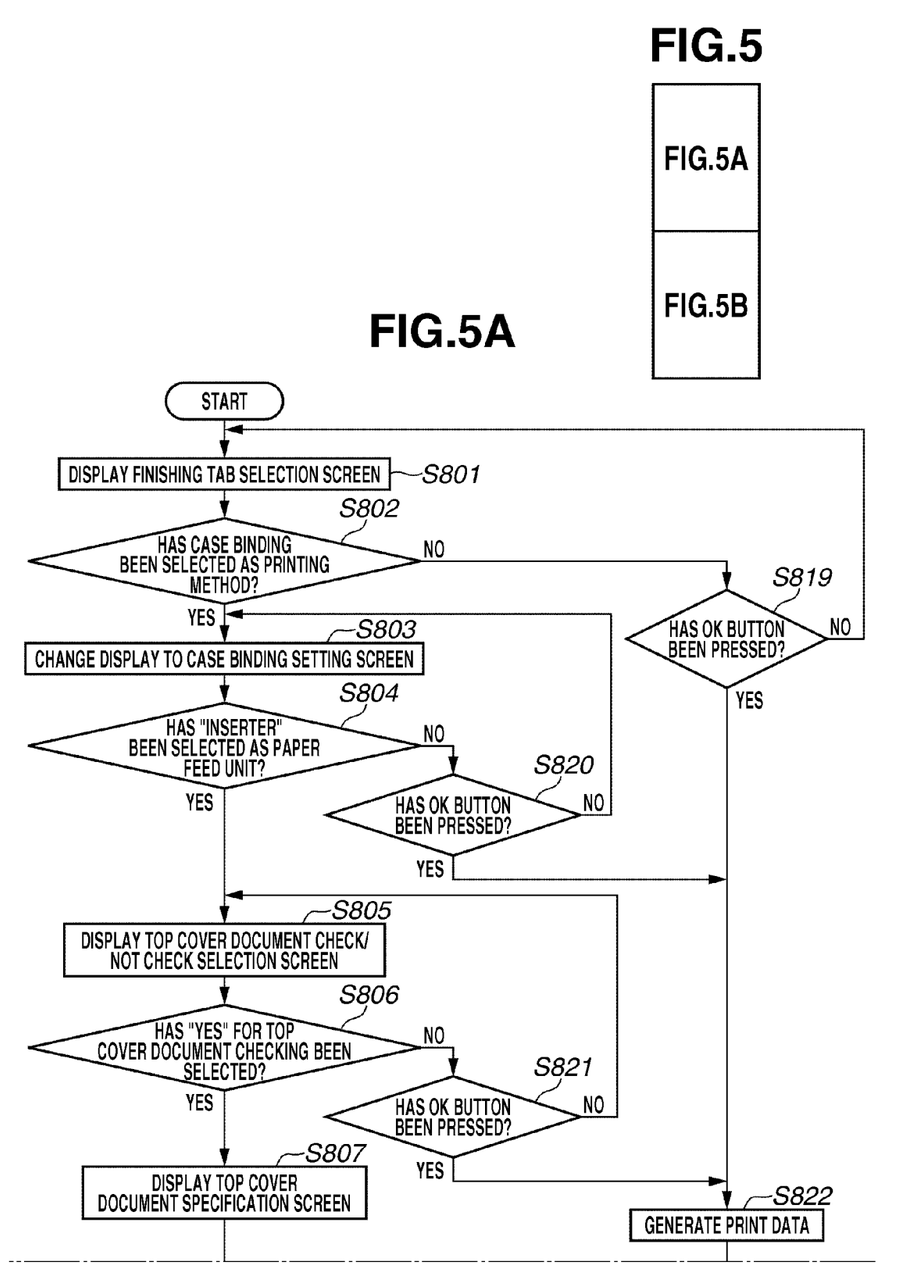

Now, an example of an operation of the printer driver of the PC 4000 will be described in detail below with reference to FIG. 5 (including FIG. 5A and FIG. 5B). FIG. 5 is a flow chart illustrating an example of data processing executed by the information processing apparatus according to the present exemplary embodiment.

In the present exemplary embodiment, processing in steps S801 through S825 is implemented by the CPU of the PC 4000 by loading and executing the printer driver on the RAM. A method for processing a job, which is executed by the information processing apparatus according to the present exemplary embodiment, will be described below.

When the operator selects "print" on a menu of the application operating on the PC 4000, the printer driver displays the screen illustrated in FIG. 4A on a display unit. Furthermore, when the operator presses the button 402, which corresponds to the item "property" by operating a pointing device, such as a mouse, of the apparatus, the printer driver displays a page setting screen on the display unit.

If the operator selects the finishing tab 405, then the processing illustrated in FIG. 5A starts. Referring to FIG. 5A, in step S801, the printer driver displays a finishing setting screen illustrated in FIG. 4B.

In step S802, the printer driver determines whether "case binding" has been selected by the operator in a "printing method" pull-down list box 406. If it is determined that "case binding" has been selected in the "printing method" pull-down list box 406 (YES in step S802), then the processing advances to step S803.

In step S803, the printer driver displays a case binding top cover setting screen illustrated in FIG. 4B on the display unit. In step S804, the printer driver determines whether "inserter" has been selected by the operator in a "paper feed unit" pull-down list box 407. If it is determined that "inserter" has been selected by the operator in a "paper feed unit" pull-down list box 407 (YES in step S804), then the processing advances to step S805.

In step S805, the printer driver displays a "check/not check top cover document" selection screen 408 on the display unit of the PC 4000. In step S806, the printer driver determines whether a radio button R1, which corresponds to "yes" (check), has been selected by the operator.

If it is determined that the operator has selected the radio button R1 (YES in step S806), then the processing advances to step S807. In step S807, the printer driver displays a "top cover document specification" screen on the display unit of the PC 4000.

As described above, in the present exemplary embodiment, the user can set whether to collate the top cover by selecting or not selecting the radio button R1, which corresponds to checking of the top cover document.

In step S808, the printer driver determines whether the operator has selected a radio button R2, which corresponds to "within the same file" via "the top cover document specification screen". If it is determined that the operator has selected the radio button R2 (YES in step S808), then the processing advances to step S809.

In step S809, the printer driver displays a pull-down list box 409 corresponding to "specified pages" on the display unit and enables selection of page numbers. In step S810, after the operator has selected the page numbers via the "specified pages" pull-down list box 409, the printer driver displays the selected page numbers.

In step S811, the printer driver determines whether the operator has pressed a button 403, which corresponds to "OK". If it is determined that the operator has pressed the button 403 (YES in step S811), then the processing advances to step S812.

In step S812, the printer driver generates checking data based on data of the pages specified via the pull-down list box 409, of original data to be printed. Furthermore, the printer driver generates print data based on the data of the pages specified as the printing range, of the original data.

In addition, the printer driver generates a print job that at least includes print data, checking data, and data for specifying case binding. By executing the above-described processing, print data and checking data is mutually associated and transmitted to the image forming apparatus. After closing a property window illustrated in FIG. 4B, the processing advances to step S823.

On the other hand, if it is determined that the operator has selected "other file" via the top cover document specification screen (NO in step S808), then the processing advances to step S813.

In step S813, the printer driver displays an entry box 410, which corresponds to a "specified file" field illustrated in FIG. 4B, and a "view" button 411, which is illustrated in FIG. 4B, on the display unit of the PC 4000.

In step S814, the printer driver determines whether the view button 411 has been pressed by the operator. If it is determined that the view button 411 has been pressed by the operator (YES in step S814), then the processing advances to step S815.

Figure 6:
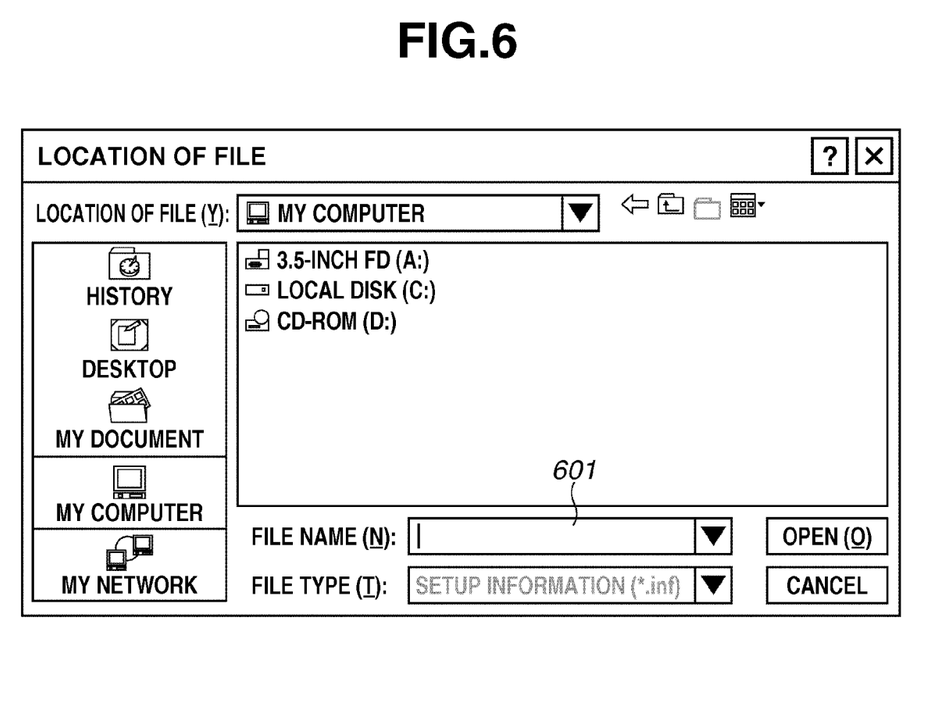
FIG. 6 illustrates an example of a UI for specifying a top cover file.

In step S815, the printer driver, in cooperation with an operating system (OS) installed on the apparatus, displays a window illustrated in FIG. 6. The exemplary window illustrated in FIG. 6 is a window for allowing the operator to select a file to be specified via a "location of file" field illustrated in FIG. 6. In the present exemplary embodiment, it is also useful if the operator (the user) directly inputs a file name of a file to be specified in the entry box 410 without pressing the button 411.

In step S816, the printer driver determines whether a file to be specified has been selected via the "location of file" window illustrated in FIG. 6 or whether the file name of a file to be specified has been directly input in the "specified file" entry box 410.

If it is determined that a file to be specified has been selected or that the file name of a file to be specified has been directly input in an entry box 601, then the processing advances to step S817. The printer driver repeats the processing in steps S814 through S817 until it is determined that the OK button 403 has been pressed by the operator.

In step S817, the printer driver determines whether the OK button 403 has been pressed. If it is determined that the OK button 403 has been pressed (YES in step S817), then the processing advances to step S818. In step S818, the printer driver generates print data based on data of the pages specified as the printing range, of the original data to be printed.

In addition, in step S808, the printer driver generates a print job that at least includes print data, checking data, and data for specifying case binding. After closing the property window illustrated in FIG. 4B, the processing advances to step S823.

On the other hand, if it is determined that the operator has not selected "case binding" (NO in step S802) and that the operator has pressed the OK button 403 in this state (YES in step S819), then the processing advances to step S822.

On the other hand, if it is determined that "inserter" has not been selected as the paper feed unit (NO in step S804) and that the operator has pressed the OK button 403 in this state (YES in step S820), then the processing advances to step S822.

On the other hand, if it is determined that "no" (not to check) has been selected as a check for the top cover document (NO in step S806) and that the operator has pressed the OK button 403 in this state (YES in step S821), then the processing advances to step S822.

In step S822, the printer driver generates print data based on the data of the pages specified as the printing range, of the original data to be printed, and generates a print job that at least includes the generated print data. After closing the property window illustrated in FIG. 4B, the processing advances to step S823.

In step S823, the printer driver displays the print menu window illustrated in FIG. 4A and determines whether the OK button 403 has been pressed. If it is determined that the OK button 403 has been pressed (YES in step S823), then the processing advances to step S825. In step S825, the printer driver transmits the print job generated in step S812, S818, or S822 to the image forming apparatus 1000. Then the processing ends.

By executing the above-described processing, the present exemplary embodiment can set information for checking the matching status (appropriateness) of the top cover sheet fed from the image forming apparatus and generate a print job including the information.

Figure 7:
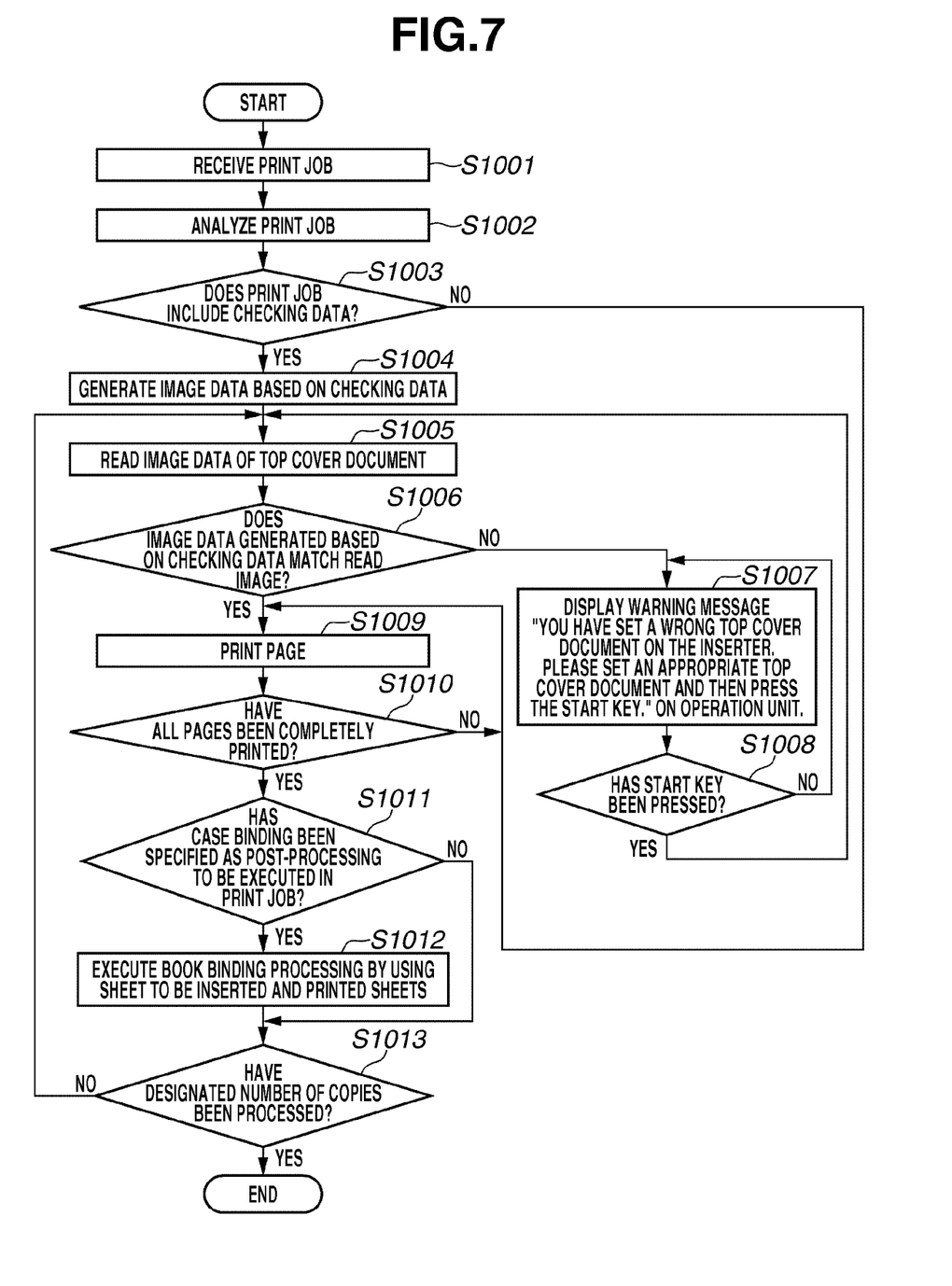
FIG. 7 is a flow chart illustrating an example of data processing executed by an image forming apparatus.

FIG. 7 is a flow chart illustrating an example of data processing executed by the image forming apparatus according to the present exemplary embodiment.

In the present exemplary embodiment, processing in steps S1001 through S1013 is implemented by the CPU 701 of the image forming apparatus 1000 by loading and executing a control program on the RAM 702. A method for processing a job, which is executed by the image forming apparatus according to the present exemplary embodiment, will be described below.

Referring to FIG. 7, in step S1001, the CPU 701 receives a print job transmitted from the PC 4000 via the LAN 5000 by using the network 710 of the controller unit 107. In step S1002, the CPU 701 analyzes the received print job.

In step S1003, the CPU 701 determines whether the received print job includes checking data. If it is determined that the received print job includes checking data (YES in step S1003), then the processing advances to step S1004. In step S1004, the CPU 701 generates image data based on the checking data on the RAM 702. More specifically, the CPU 701 determines whether the image data matches the image data read from the top cover.

In step S1005, the CPU 701 controls the inserter 104 of the printer unit 100 to convey the top cover document to the reading unit 47, read the image of the top cover document, which is fed by the reading unit 47, and generates image data corresponding to the image of the top cover document. In the present exemplary embodiment, it is supposed that the top cover document is previously set in a paper storage unit specified by the operator (the paper storage unit 42 or 43 of the inserter 104).

In step S1006, the CPU 701 collates the image data generated in step S1004 with the image data of the image read in step S1005 to determine whether they match each other. In other words, in step S1006, the CPU 701 collates the image data of the page or the file specified by the user with the image data read from the fed top cover document and determines whether they match each other. The CPU 701 controls execution of a job that requires finishing processing based on a result of the collation.

Figure 8:
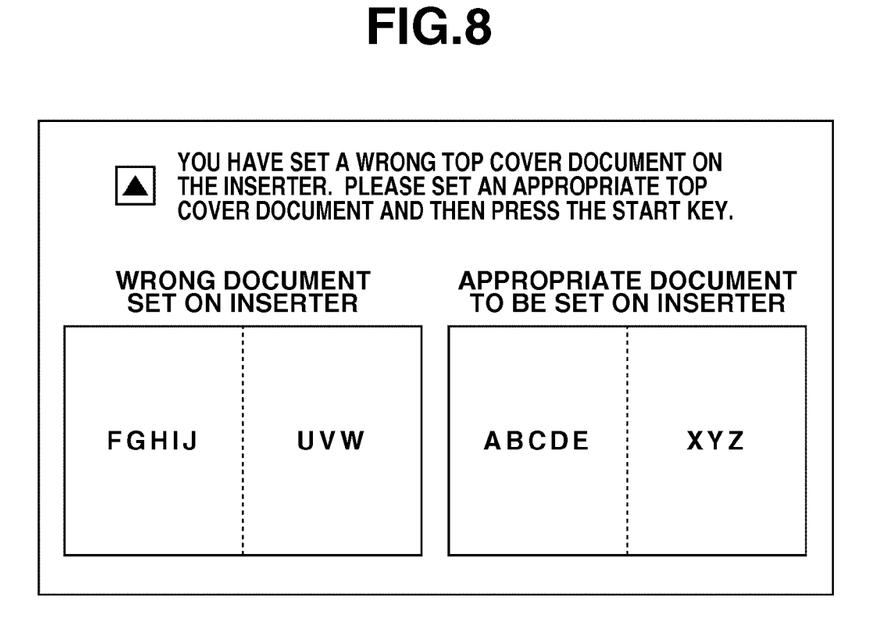
FIG. 8 illustrates an example of a warning screen that notifies an error on a top cover draft.

If it is determined that the image data do not match each other (NO in step S1006), then the processing advances to step S1007. In step S1007, the CPU 701 displays a message on the display 32 of the operation unit 103. More specifically, as illustrated in FIG. 8, the CPU 701 displays a warning message on the display 32, such as "You have set a wrong top cover document on the inserter A. Please set an appropriate top cover document and then press the start key."

In the present exemplary embodiment, the CPU 701 displays a message that prompts the user to verify and change the top cover document set on the inserter. However, the present exemplary embodiment is not limited to this. More specifically, it is also useful if the CPU 701 displays a message that notifies the user that the user has set the top cover document on wrong edges or that the user has set a blank paper if the user has done so.

In addition, the CPU 701 displays the image data read by the reading unit 47 as a "document set on the inserter". Furthermore, the CPU 701 displays image data generated based on the checking data as a "document to be set on the inserter".

In step S1008, the CPU 701 determines whether the user has pressed a start key (not illustrated) of the operation unit 103. If it is determined that the user has pressed the start key of the operation unit 103 (YES in step S1003), then the processing returns to step S1005.

On the other hand, if it is determined that the image data generated based on the checking data and the image data read from the top cover document matches each other as a result of the collation thereof (YES in step S1006), then the processing advances to step S1009.

In step S1009, the CPU 701, by using the printer unit 100, prints the page to be printed (the pages specified as the printing range) based on the print data of the received print job. In step S1010, the CPU 701 determines whether all the print target pages have been completely printed.

If it is determined that all the print target pages have been completely printed (YES in step S1010), then the processing advances to step S1011. In step S1011, the CPU 701 determines whether post-processing to be executed on the sheet, which is specified in the print job, is case binding.

If it is determined that post-processing to be executed on the sheet is case binding (YES in step S1011), then the processing advances to step S1012. In step S1012, the CPU 701 executes, by integrally using the book binding unit 105, book binding processing by using the sheet to be inserted and the printed sheet, which is an output product output in step S1009.

In step S1013, the CPU 701 determines whether the specified number of copies have been completely processed. If it is determined that the specified number of copies have not been completely processed yet (NO in step S1013), then the processing returns to step S1005 and repeats the above-described processing until the specified number of copies are completely processed. On the other hand, if it is determined that the specified number of copies have been completely processed (YES in step S1013), then the processing ends.

With the above-described configuration, the present exemplary embodiment can restrict or prevent execution of a job where a finished sheet, which has been specified in the job, does not match another finished sheet, which has been fed.

In addition, in the present exemplary embodiment having the above-described configuration, it becomes unnecessary to previously print information for identifying a sheet to be finished, which is necessary in a conventional method. Accordingly, the present exemplary embodiment can prevent degradation of the design of a top cover.

It is also useful, in step S1005, if the image data of the sheet to be finished, which has been read by the reading unit 47, is displayed on the operation unit 103 as a preview image to allow the user to visually verify a state of the top cover before the processing of the job starts.

Figure 5B:
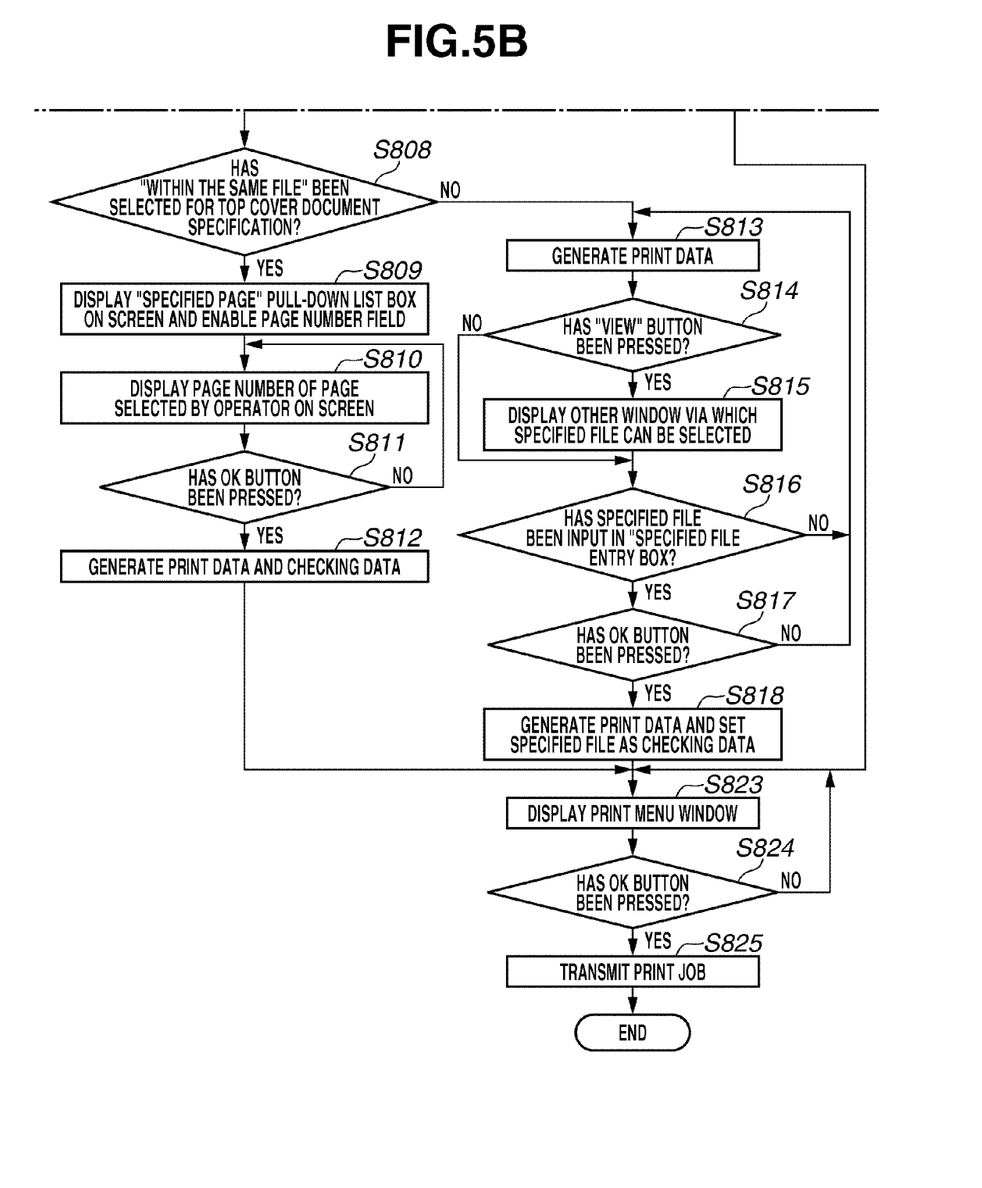

In step S812 illustrated in FIG. 5B, it is also useful if print data is generated based on data of all pages of the original data to be printed. In this case, the printer driver generates a print job including at least the checking data indicating the page specified in the pull-down list box 409 and data indicating the pages specified as the printing range.

In this case, in step S1004 illustrated in FIG. 7, the CPU 701 generates image data based on the data of the page indicated in the page data, of the print data.

In the first exemplary embodiment described above, the inserter 104 of the image forming apparatus 1000 includes the reading unit 47. The first exemplary embodiment reads an image on the sheet to be inserted by using the reading unit 47.

However, an image forming apparatus does not always have a reading unit within the printer unit 100 including the inserter 104. Now, image formation processing including top cover collation processing executed by an image forming apparatus that does not include a reading unit within the printer unit 100 according to a second exemplary embodiment, will be described in detail below.

In the present exemplary embodiment, it is supposed that the image forming apparatus 1000 does not include a reading unit 47, which is included in the image forming apparatus 1000 according to the first exemplary embodiment. More specifically, the present exemplary embodiment reads an image on the sheet to be inserted, by using the scanner unit 106 instead of the reading unit 47.

Figure 9:
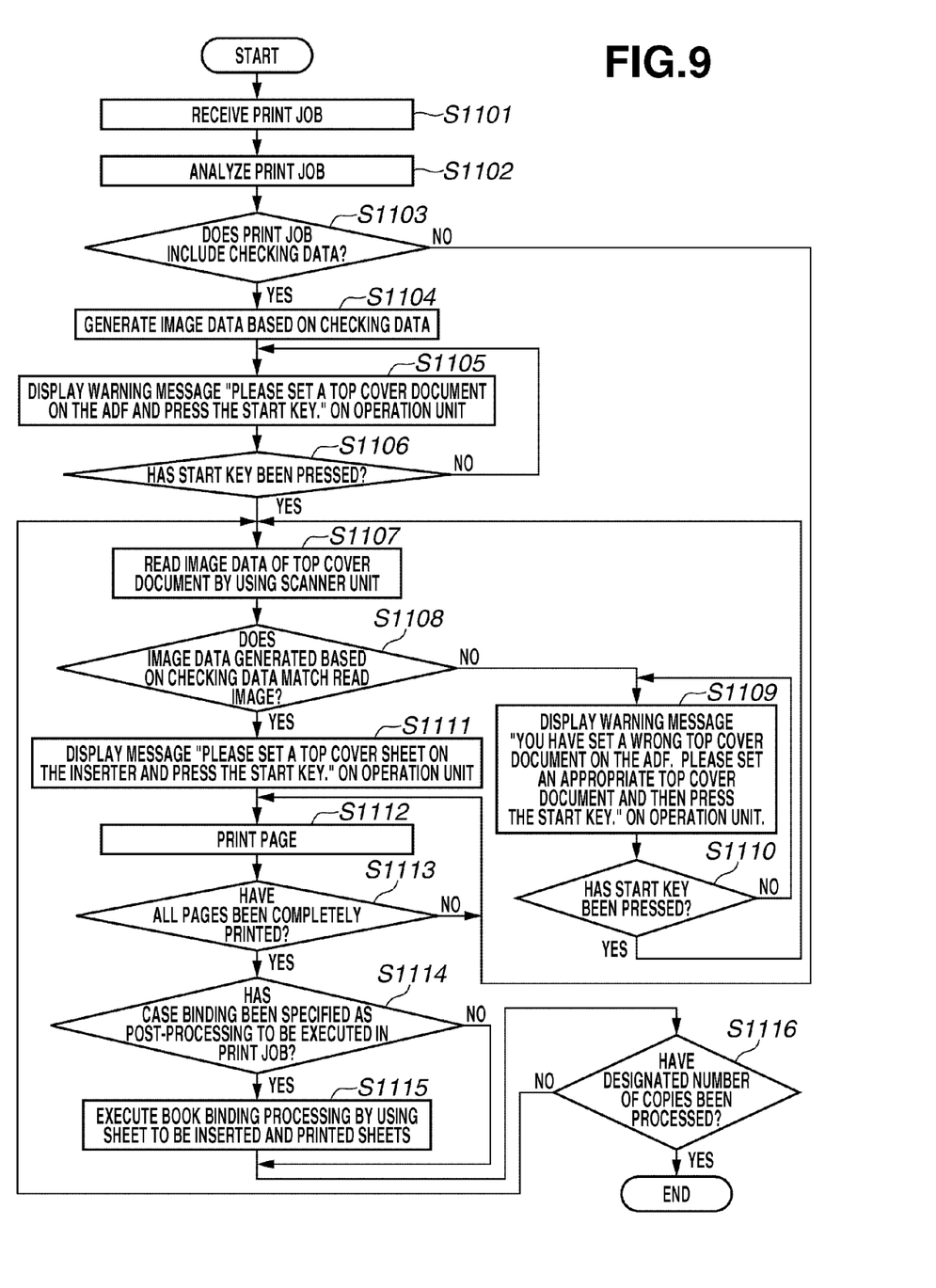
FIG. 9 is a flow chart illustrating an example of data processing executed by an image forming apparatus.

FIG. 9 is a flow chart illustrating an example of data processing executed by the image forming apparatus according to the present exemplary embodiment. In the present exemplary embodiment, processing in steps S1101 through S1116 is implemented by the CPU 701 of the image forming apparatus 1000 loading and executing a control program on the RAM 702. A method for processing a job, which is executed by the information processing apparatus according to the present exemplary embodiment, will be described below.

Referring to FIG. 9, in step S1101, the CPU 701 receives a print job transmitted from the PC 4000 via the LAN 5000 by using the network 710 of the controller unit 107. In step S1102, the CPU 701 analyzes the received print job.

In step S1103, the CPU 701 determines whether the received print job includes checking data. If it is determined that the received print job includes checking data (YES in step S1103), then the processing advances to step S1104. In step S1104, the CPU 701 generates image data based on the checking data on the RAM 702.

In step S1105, the CPU 701 displays a message on the display 32 of the operation unit 103, such as "Please set a top cover document on the ADF and press the start key." In step S1106, the CPU 701 determines whether the start key of the operation unit 103 has been pressed. If it is determined that the start key of the operation unit 103 has been pressed (YES in step S1106), then the processing advances to step S1107. In step S1107, the CPU 701 uses the scanner unit 106 to read an image of the top cover document set on the ADF 11.

In step S1108, the CPU 701 collates the image data generated in step S1104 and the image data of the image read in step S1107. More specifically, the CPU 701 determines whether they match each other.

In other words, in step S1106, the CPU 701 collates the image data of the page or the file specified by the user with the image data read from the fed top cover document and determines whether they match each other. If it is determined that the image data do not match each other (NO in step S1106), then the processing advances to step S1109.

In step S1109, the CPU 701 displays a message on the display 32 of the operation unit 103, such as "You have set a wrong top cover document on the ADF. Please set an appropriate top cover document and then press the start key". In step S1110, the CPU 701 determines whether the user has pressed a start key (not illustrated) of the operation unit 103. If it is determined that the user has pressed the start key of the operation unit 103 (YES in step S1103), then the processing returns to step S1107.

On the other hand, if it is determined that the image data generated based on checking data matches the image data of the image read by using the scanner unit 106 as a result of the collation thereof (YES in step S1108), then the processing advances to step S1111. In step S1111, the CPU 701 displays a message on the display 32 of the operation unit 103, such as "Please set a top cover sheet on the inserter and press the start key."

In step S1112, the CPU 701, by using the printer unit 100, prints the page to be printed (the pages specified as the printing range) based on the print data of the received print job. In step S1113, the CPU 701 determines whether all the print target pages have been completely printed. If it is determined that not all the print target pages have been printed yet (NO in step S1113), then the processing returns to step S1112 and repeats the above-described processing until all the print target pages are completely printed. On the other hand, if it is determined that all the print target pages have been completely printed (YES in step S1113), then the processing advances to step S1114.

In step S1114, the CPU 701 determines whether case binding has been specified in the currently processed print job. If it is determined that case binding has been specified in the currently processed print job (YES in step S1114), then the processing advances to step S1115. On the other hand, if it is determined that processing other than case binding has been specified in the currently processed print job (NO in step S1114), the processing advances to step S1116.

In step S1115, the CPU 701 executes, by the book binding unit 105 of the printer unit 100, book binding processing for both the sheet to be inserted and the printed sheet, which is an output product output in step S1009.

In step S1116, the CPU 701 determines whether the specified number of copies have been completely printed. If it is determined that the specified number of copies have not been completely processed yet (NO in step S1116), then the processing returns to step S1107 and repeats the above-described processing until the specified number of copies are completely processed. On the other hand, if it is determined that the specified number of copies have been completely processed (YES in step S1116), then the processing ends.

In the above-described first exemplary embodiment, the reading unit 47 included in the inserter 104 reads an image of the top cover document. However, the present invention is not limited to this. More specifically, it is also useful if a reading unit is provided within the book binding unit 105. Alternatively, it is also useful if a reading unit is provided at any location within the printer unit 100 where a top cover document is conveyed.

Furthermore, in the first exemplary embodiment described above, a top cover document is inserted from the inserter 104. However, the present invention is not limited to this. More specifically, it is also useful if a top cover document is inserted from the paper feed unit 101.

Furthermore, in the above-described first and second exemplary embodiments, the page to be printed is printed if it is determined that the image data generated based on checking data matches the read image data. However, it is also useful if printing of the page to be printed is executed in parallel to the processing for generating or reading image data.

Moreover, in the above-described first and second exemplary embodiments, a top cover document is inserted. However, the present invention is not limited to this. More specifically, it is also useful if a document other than a top cover document is inserted.

In addition, in the above-described first and second exemplary embodiments, a warning message is displayed on the display 32 if it is determined that the image data generated based on checking data does not match the read image data as a result of collation thereof. However, the present invention is not limited to this. More specifically, it is also useful if a warning message is transmitted from the image forming apparatus to the PC 4000 and the received warning message is displayed on a screen provided by the printer driver.

Exemplary embodiments of the present invention are as described above. However, the purpose and the scope of the present invention are not limited to a specific description made herein as far as a person skilled in the art can devise.

The above-described finishing processing and book binding processing is processing executed on a printed sheet (post-processing).

In each of the exemplary embodiments of the present invention, it is determined whether the sheet to be inserted is an appropriate sheet. However, the present invention is not limited to this. More specifically, it is also useful if it is determined whether the orientation of the sheet to be inserted is appropriate.

More specifically, in this case, the image forming apparatus 1000 identifies and recognizes the orientation of characters, if the image data transmitted from the PC includes a character, and determines the orientation of the image data according to the identified orientation of the character.

In addition, in this case, if the image data read by the reading unit 47 includes a character, the image forming apparatus 1000 determines the orientation of the image data read by the reading unit 47 based on the orientation of the character.

Furthermore, in this case, if the orientation of the image data match each other, the image forming apparatus 1000 can execute printing and book binding processing. Moreover, if it is determined that the orientations of the image data do not match each other, the image forming apparatus 1000 can display a message that prompts the user to verify the orientation of the sheet to be inserted.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-184102 filed Aug. 7, 2009, which is hereby incorporated by reference herein in its entirety.

What is claimed is:

1. A printing apparatus for printing an image on at least one sheet, controlling to convey the at least one sheet to a post-processing apparatus, and controlling the post-processing apparatus to execute a post-processing on the at least one sheet and a preprinted sheet, the printing apparatus comprising:
an input unit configured to input image data generated by reading the preprinted sheet;
a receiving unit configured to receive checking data for checking an image of the preprinted sheet;
a determining unit configured to determine whether the checking data matches the image data input by the input unit; and
a control unit configured to control, in a case where the determining unit determines that the checking data does not match the image data, not to print the image on the at least one sheet, and to control, in a case where the determining unit determines that the checking data matches the image data, to print the image on the at least one sheet and controlling the post-processing apparatus to execute the post-processing on the at least one sheet and the preprinted sheet.

2. The printing apparatus according to claim 1, wherein the control unit is configured, in a case where the determining unit determines that the checking data matches the image data, to control to print the image on the at least one sheet.

3. The printing apparatus according to claim 1, further comprising a display unit configured to display image data before starting the printing.

4. The printing apparatus according to claim 1, wherein the receiving unit receives, from an external apparatus, the checking data for checking the image of the preprinted sheet.

5. The printing apparatus according to claim 1, wherein in a case where the determining unit determines that the checking data does not match the image data, the control unit displays, on a display unit, a message that prompts a user to verify the preprinted sheet to be post-processed.

6. The printing apparatus according to claim 1, wherein the post-processing includes an insertion processing for inserting the preprinted sheet into a print product that is output by the printing or a book binding processing for binding the print product into a book by using the preprinted sheet.

7. The printing apparatus according to claim 3, wherein the display unit displays the image data and the checking data before starting the printing.

8. A method for controlling a printing apparatus for printing an image on at least one sheet, controlling to convey the at least one sheet to a post-processing apparatus, and controlling the post-processing apparatus to execute a post-processing on the at least one sheet and a preprinted sheet as a unit, the method comprising:
inputting image data generated by reading the preprinted sheet;
receiving checking data for checking an image of the preprinted sheet;
determining whether the checking data matches the input image data; and
controlling, in a case where it is determined that the received checking data does not match the input image data, not to print the image on the at least one sheet, and controlling, in a case where it is determined that the checking data matches the image data, to print the image on the at least one sheet and controlling the post-processing apparatus to execute the post-processing on the at least one sheet and the preprinted sheet.

9. The method according to claim 8, further comprising controlling to print the image on the at least one sheet in a case where it is determined that the checking data matches the image data.

10. The method according to claim 8, further comprising displaying image data before starting the printing.

11. The method according to claim 8, further comprising displaying a message that prompts a user to verify the preprinted sheet to be post-processed in a case where it is determined that the checking data does not match the image data.

12. The method according to claim 8, wherein the post-processing includes an insertion processing for inserting the preprinted sheet into a print product that is output by the printing or a book binding processing for binding the print product into a book by using the preprinted sheet.

* * * * *